United States Patent
Kaneblai Martins Costa et al.

(10) Patent No.: US 10,003,683 B2
(45) Date of Patent: Jun. 19, 2018

(54) METHOD FOR COMMUNICATION BETWEEN USERS AND SMART APPLIANCES

(71) Applicant: SAMSUNG ELECTRÔNICA DA AMAZÔNIA LTDA., Campinas (BR)

(72) Inventors: Gustavo Kaneblai Martins Costa, Campinas (BR); Alexandre Barbosa Silveira, Campinas (BR); Rodrigo Jose Tobias, Campinas (BR); Renata Zilse Pereira Borges, Campinas (BR); Viviane Ortiz Delvequio Franco, Campinas (BR); Paulo Victor Motta, Campinas (BR); Fábio Rogério Piva, Campinas (BR); Daniel Gustavo Pellacani Petrini, São Paulo (BR); Thiago Lopes Ramos, São Paulo (BR); Taehwan Kim, São Paulo (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 384 days.

(21) Appl. No.: 14/662,714

(22) Filed: Mar. 19, 2015

(65) Prior Publication Data
US 2016/0255186 A1 Sep. 1, 2016

(30) Foreign Application Priority Data
Feb. 27, 2015 (BR) .............. 102015004521

(51) Int. Cl.
*G06F 15/16* (2006.01)
*H04M 1/725* (2006.01)
(Continued)

(52) U.S. Cl.
CPC ........ *H04M 1/72533* (2013.01); *G06F 17/20* (2013.01); *G10L 15/18* (2013.01);
(Continued)

(58) Field of Classification Search
CPC ......... H04L 51/04; H04L 51/18; H04L 51/26; H04L 51/36; H04L 61/2007;
(Continued)

(56) References Cited

U.S. PATENT DOCUMENTS 6,754,647 B1 * 6/2004 Tackett ................. G06F 17/279
                                                              700/246
6,772,109 B2 * 8/2004 Tsuchitani .............. G06F 9/546
                                                              704/2
(Continued)

*Primary Examiner* — Imad Hussain

(57) ABSTRACT

The present invention provides a method (200) that allows users (211) of smart appliances to interact in a similar way with objects (202, 207) such as devices, smart appliances, Web services, software applications (THINGS/objects) and people (212) and also the communication of an object (202) with another object (207). The provided method comprises mapping the entire object (207) connected as a contact. These contacts (objects) will act as real instant messaging contacts, receive user commands and entries in a natural language fashion and provide response using the IM interface. Such objects (202, 207) must register as an instant messaging user on a common instant messaging server (210). Furthermore, an application wrapper (208) is also used to map an instant messaging contact and an object allowing an object not supporting this solution to be used by a device implementing the proposed method.

10 Claims, 7 Drawing Sheets

(51) Int. Cl.
*H04L 12/58* (2006.01)
*G06F 17/20* (2006.01)
*G10L 15/18* (2013.01)
*H04L 29/08* (2006.01)

(52) U.S. Cl.
CPC ............ *H04L 51/04* (2013.01); *H04L 67/025* (2013.01); *H04W 4/80* (2018.02); *H04M 1/72552* (2013.01); *H04W 4/70* (2018.02)

(58) Field of Classification Search
CPC ............ H04L 61/2076; H04L 61/2514; H04L 61/3065; H04L 51/02; H04W 4/008; H04W 4/02; G06Q 10/10; G06Q 50/06; H04M 2250/10; H04M 2250/12; H04M 1/72533; A63F 13/12; A63F 13/34; A63F 13/77; A63F 13/798; A63F 13/803; G06K 9/00456; G06K 9/6281; H04N 1/00209; H04N 1/32037; H04N 1/32133; H04N 1/32667; H04N 2201/0039; H04N 2201/0093; H04N 21/2541; H04N 21/26258; G10L 15/18; G06F 17/20
USPC ........................................................ 709/206
See application file for complete search history.

(56) References Cited

U.S. PATENT DOCUMENTS

| | | | | |
|---|---|---|---|---|
| 6,951,021 | B1* | 9/2005 | Bodwell ................. | G06F 9/465 719/315 |
| 7,409,333 | B2* | 8/2008 | Wilkinson ............. | G06F 17/275 704/2 |
| 7,512,660 | B2* | 3/2009 | Nakada ................... | G06F 9/546 704/9 |
| 8,224,906 | B2* | 7/2012 | Mikkonen ......... | G06F 17/30976 455/412.1 |
| 8,285,652 | B2* | 10/2012 | Biggs ................ | G06F 17/30864 706/11 |
| 9,009,230 | B1* | 4/2015 | Matthieu ................. | H04L 67/12 709/204 |
| 9,185,066 | B2* | 11/2015 | Douillet ................ | G06Q 10/10 |
| 9,507,849 | B2* | 11/2016 | Mohajer ........... | G06F 17/30864 |
| 9,548,050 | B2* | 1/2017 | Gruber ............... | G06F 17/3087 |
| 9,654,434 | B2* | 5/2017 | Sone ..................... | H04L 51/16 |
| 2002/0133347 | A1* | 9/2002 | Schoneburg ............ | G06F 17/27 704/257 |
| 2003/0063072 | A1* | 4/2003 | Brandenberg ............ | G01S 5/02 345/173 |
| 2003/0078979 | A1* | 4/2003 | Sagi ........................ | H04L 29/06 709/206 |
| 2003/0093480 | A1* | 5/2003 | Lagarde ................... | H04L 51/04 709/206 |
| 2003/0101343 | A1* | 5/2003 | Eaton ..................... | H04L 51/04 713/170 |
| 2003/0182391 | A1* | 9/2003 | Leber ................. | G06F 17/30864 709/217 |
| 2003/0220972 | A1* | 11/2003 | Montet ................... | H04L 51/04 709/204 |
| 2004/0073643 | A1* | 4/2004 | Hayes .................. | G06Q 10/107 709/223 |
| 2004/0103153 | A1* | 5/2004 | Chang ................. | H04L 12/2602 709/206 |
| 2004/0162873 | A1* | 8/2004 | Kojima ................... | H04L 29/06 709/203 |
| 2004/0172640 | A1* | 9/2004 | Luo ....................... | G06F 9/4433 719/328 |
| 2004/0199581 | A1* | 10/2004 | Kucharewski ......... | G06Q 10/10 709/204 |
| 2005/0102065 | A1* | 5/2005 | McBride .............. | G06N 99/005 700/264 |
| 2006/0093998 | A1* | 5/2006 | Vertegaal ................ | G06F 3/011 434/236 |
| 2006/0156063 | A1* | 7/2006 | Mazzarella ............ | G06Q 10/10 714/12 |
| 2007/0043878 | A1* | 2/2007 | Carlson ............ | G06F 17/30905 709/246 |
| 2007/0143475 | A1* | 6/2007 | Daigle ................ | G06F 21/6245 709/225 |
| 2007/0203977 | A1* | 8/2007 | Wu ....................... | H04L 12/581 709/203 |
| 2007/0271367 | A1* | 11/2007 | Yardeni ................ | G06Q 10/107 709/223 |
| 2008/0055269 | A1* | 3/2008 | Lemay .................. | G06F 3/0482 345/173 |
| 2008/0089490 | A1* | 4/2008 | Mikkonen ......... | G06F 17/30976 379/88.14 |
| 2008/0155018 | A1* | 6/2008 | Fortier .................. | G06Q 10/10 709/204 |
| 2008/0155031 | A1* | 6/2008 | Fortier ................ | G06Q 10/107 709/206 |
| 2008/0205655 | A1* | 8/2008 | Wilkins ................. | G06Q 10/10 380/279 |
| 2009/0024705 | A1* | 1/2009 | Rama Rao ............ | G06Q 10/00 709/206 |
| 2009/0281966 | A1* | 11/2009 | Biggs ................ | G06F 17/30864 706/11 |
| 2011/0071819 | A1* | 3/2011 | Miller .................. | G06F 17/273 704/9 |
| 2011/0106746 | A1* | 5/2011 | Ventilla ................. | G06Q 10/10 706/50 |
| 2011/0125487 | A1* | 5/2011 | Ylonen ................. | G06F 17/271 704/9 |
| 2011/0161478 | A1* | 6/2011 | Formo .................. | H04L 63/105 709/223 |
| 2012/0115455 | A1* | 5/2012 | Rao ....................... | H04W 12/06 455/418 |
| 2012/0245944 | A1* | 9/2012 | Gruber ................ | G06F 17/3087 704/270.1 |
| 2013/0144961 | A1* | 6/2013 | Park ..................... | H04L 51/046 709/206 |
| 2013/0311447 | A1* | 11/2013 | Liensberger ....... | G06F 17/30427 707/722 |
| 2014/0201835 | A1* | 7/2014 | Emigh .................... | G06F 21/55 726/23 |
| 2015/0006696 | A1* | 1/2015 | Hershberg .............. | H04L 67/12 709/223 |
| 2015/0195224 | A1* | 7/2015 | Karnin .................. | H04L 51/046 706/12 |
| 2015/0334077 | A1* | 11/2015 | Feldman ................ | H04L 51/32 715/744 |
| 2016/0092410 | A1* | 3/2016 | Martin .................. | G06F 17/214 715/269 |
| 2016/0092411 | A1* | 3/2016 | Martin .................. | H04L 51/043 715/269 |
| 2016/0105292 | A1* | 4/2016 | Choi .................... | H04L 51/02 709/206 |
| 2016/0330327 | A1* | 11/2016 | Lee ....................... | H04L 12/12 |
| 2017/0220574 | A1* | 8/2017 | Liensberger ....... | G06F 17/30336 |
| 2018/0054524 | A1* | 2/2018 | Dahan .................. | H04M 3/568 |

* cited by examiner

METHOD FOR COMMUNICATION BETWEEN USERS AND SMART APPLIANCES

CROSS-REFERENCE TO RELATED APPLICATIONS

This application claims the benefit of Brazilian Application No. 10 2015 004521 2, filed Feb. 27, 2015, in the Brazilian Intellectual Property Office, the disclosure of which is incorporated herein by reference.

FIELD OF THE INVENTION

The method of the present invention aims to centralize and allow interactions (exchange of messages) among various devices, smart appliances, web services, software applications (THINGS) and people. More specifically, the method of the present invention provides an instant messenger based solution to Internet of Things (IoT), preferably through devices such as smart watches, smart glasses, sensors for smart cities, smart appliances in general and so on.

BACKGROUND OF THE INVENTION

The Internet has greatly changed over the past several years. Until two decades ago, the main entrance for accessing the web was through a web browser such as Microsoft Internet Explorer, Netscape Navigator, Mosaic, Opera and alike. Finding the desired content, however, was a far-from-trivial task: the web browser did not offer any form of guidance or recommendation to the user, serving instead as a mere instrument of access (a graphical user interface to visualize web pages). This fact motivated several web sites, also known as web portals, to try and organize the otherwise scattered content. But the Internet grew faster than portals' capabilities to organize the astounding universe of available content. In that scenario, finding the desired content was a matter of luck.

In order to organize this vast amount of available content, some web sites, known as "search engines", started to index the available content and offering to the users a way of locating the right web site in which their desired content could be found. Amongst all the search engines, there was one in particular that seemed to provide the best search results: Google, which then has become the main entrance to the web.

Eventually, finding content was just not enough anymore and several social networks—virtual communities where people can share content with friends and give feedback on received recommendations—soon became a great part of people's online lives. Facebook™ became the most popular of them and, for many people, the new "main entrance" to the web.

Nowadays a new kind of social networks has been rising. A well-know web service, namely "instant messaging" (IM), has progressively incorporated many features typically found on social networks. On one hand, users can now share content with friends through instant messengers, but cannot broadcast it to all people on their contact list. Only limited groups of specific people can access user-shared content and comments. Instead of having a public timeline, where anyone can see every information, the timeline concept has evolved into a record of previously-shared data, content, and ideas between the user and his/her closest ones. "Snapchat" and "WhatsApp", for instance, are two of the most popular players amongst IM-based social networks. The use of instant messaging services as a social network has been widely adopted by teenagers, who want to share content without being bullied by others, including family. Those are some of the reasons why IM is quickly becoming the next "main entrance" to the web.

Nevertheless, the web is changing, and so are the devices used to access it. In the mid-1990, the personal computer was the most popular tool for accessing the web, what recently has changed with the popularization of the technological advances of smartphones, which are currently the preferred devices for most people to remain connected. And yet, a new kind of devices lies on the horizon, the so-called "wearable computers", such as smart watches, smart glasses, smart wristbands—these are some instances of existing commercial wearable devices with high potential to prevail in the market, according to some experts. However, one important question remains unanswered: How users will interact with content through these devices, which present very small screens or, in some cases, even no screen at all, is unknown.

Patent document US 2014/0173751 A1, titled: "System and Method for Chatting with Machines", published on Jun. 19, 2014, describes a human-machine chatting system that allows a human to retrieve real time performance information from a machine. The document US 2014/0173751 A1 is related to the proposed invention in the sense that it relies on a chat-based, conversational interface for human communication with a device. However, the matter of the prior art document is strictly designed for allowing the human to retrieve performance-related information concerning the monitored machine, as opposed to the present invention, which is intended as a platform for interacting not only with devices, but also with other human users, as if all of them were "contacts" on a contact list. The solution of the document US 2014/0173751 A1 does not mention the use of natural language to "chat" with machines, and this is one of the main purposes of the present invention. Also, the matter revealed by the present invention relies on the human user to issue commands capable of operating the device remotely—as well as allowing devices to command each other in a contextual fashion.

Patent document US 2014/0173026 A1, titled: "Method and Apparatus for Cross Device Notifications", published on Jun. 19, 2014 proposes a method and apparatus for cross-device notifications between software applications. The document US 2014/0173026 A1 approaches the problem of managing multiple instances of the same application being executed by multiple devices, all of which belonging to the same use. The present invention, on the other hand, is meant to provide an universal communication framework that unifies human-human, human-device and device-device communications under the representation of "contacts in a contact list", as well as providing a transparent, conversational interface for contacts to interact.

In the work of Guinard and Trifa, "Towards the Web of Things: Web Mashups for Embedded Devices" (2009), the authors describe a framework for device-device communication, which is suitable for Internet of Things (IoT) contexts and in which each device is represented as a "web resource"—as opposed to being represented as a "contacts in a contact list". Also, the previous contribution encompasses neither human-human nor human-device communication, nor it suggests a unifying representation for humans and devices (i.e., "contacts in a contact list")—an aspect that remains the focus of the proposed invention.

Patent document CN 103475707 A, titled: "Universal System for Supporting Internet of Things", published on Dec. 25, 2013, describes a universal system for interconnecting smart devices in Internet of Things (IoT) scenarios. The document CN 103475707 A is related to the present invention in the sense that it offers a framework for allowing device-device communication. However, this prior art document is limited to device-device communication—while the present invention provides a network through which devices and humans are able to communicate with each other in a conversational fashion.

Patent document U.S. Pat. No. 6,731,307 B1, titled: "User Interface/Entertainment Device that Simulates Personal Interaction and Responds to User's Mental State and/or Personality", published on May 4, 2004, describes an interaction simulator that, through sensorial data captured from the user, adapts the nature of interaction to the user's current mental state or personality. Such prior art document is related to the present invention in the sense that it provides an anthropomorphized system capable of conversational interaction with a human user. However, the U.S. Pat. No. 6,731,307 B1 does not predict a complete network that connects all devices belonging to the same user in a chatroom-like virtual structure, through which those devices are able to exchange information among themselves, as well as with human actors, in a conversational fashion.

Patent document US 2011/0153750 A1, titled: "Computer to Mobile Two-Way Chat System and Method", published on Jun. 23, 2011, discloses a user-driven, text-based chat system for two-way communication. The document US 2011/0153750 A1 is related to the present invention in the sense that it approaches communication in a simplified, text-oriented fashion, under the premise that "texting" has become the preferred form of communication. However, the provided system is designed for human-human communication, with devices serving only as interfaces between the (human) user and the system. In the proposed invention, devices and humans alike take the role of "users", and rely on "texting" for interacting with each other.

Patent document U.S. Pat. No. 7,995,064 B2, titled: "Computer-implemented Chat System Having Dual Channel Communications and Self-defining Product Structures", published on Apr. 13, 2006, describes a chat system characterized by dual-channel communication. Similarly to the present invention, the document U.S. Pat. No. 7,995,064 B2 allows the user to send text messages to other human users, as well as to enter text commands that will be executed. However, as opposed to the present invention, the document U.S. Pat. No. 7,995,064 B2 differentiates text commands from messages at an input level, by means of an escape character; a message is always sent to another human user, but a command is never sent—being instead executed by the chat system itself. In the present invention, all text inputs are interpreted and sent as messages; a message will be executed as a command if its receiver is a device (not a human "contact"). In that case, the user's command is directed towards the other end of the communication—a device—as opposed to the chat system itself.

One solution proposed for this issue is the use of voice-based interfaces. Specifically, the use of speech-to-text (STT) and text-to-speech (TTS) technologies allow the content to be respectively "typed into" and "read by" a smart device, more specifically a wearable device that usually presents screen too small and ill-suited to data entrance (typing). This convergence to STT and TTS also seems suitable for IM systems, as the main purpose of the service remains unchanged: allowing users to exchange "text" messages with your contacts.

Rather than mere speculation, reinforcing the fact that IM services are becoming the "main entrance" to the web, and the fact that it represents a well-known interface to users these days, in 2014, LG launched a smart home solution called "HomeChat", featuring an IM-based service that allows users to exchange text messages with smart appliances such as a smart refrigerator or a smart wash machine. It relies on Natural Language Processing (NLP) techniques as a means to provide a human-like interaction among users and smart appliances. However, this IM service is not integrated with IM services used to exchange messages with real people.

Another fact that supports this trend of using IM as an user interface for smart appliances is the use of the XMPP (Extensible Messaging and Presence Protocol)—one of the most popular IM protocols available—on the so-called Internet of Things (IoT). In fact, a specific protocol extension (XEP-0325: Internet of Things—Control) was particularly proposed to handle this specific usage.

To the extent of our knowledge, a complete IM-based solution that allows communication between people and devices alike is yet to be proposed—both as a web service and software application. This implies on a thorough understanding on how people use devices to interact with people, and how they use the same device to interact with web services and software applications.

With that in mind, it would be desirable to have a unified interaction language, a method to enable users to interact with devices, smart appliances, web services, software applications and people alike—in a seamless, intuitive fashion.

SUMMARY OF THE INVENTION

In this sense, the present invention provides a method that enable smart devices users to interact in a similar manner with devices, smart appliances, web services, software applications (THINGS/objects) and people. Considering that people are represented as contacts in a contact list on smart devices, the provided method uses this same approach by mapping every connected object as contacts. These contacts (objects) will act as real instant messaging contacts, receiving commands and inputs from users in a natural language way and provide feedback using the instant messaging interface. These objects should log in as instant messaging user in a common instant messaging server. A wrapper application might also be used to map an instant messaging contact and an object, allowing an object not prepared with this solution to be used by an apparatus implementing the proposed method.

The purposes of the present application are achieved by means of a method for communication between people and objects connected to an instant messaging server on cloud, wherein people and objects are similarly logged in as contacts in a contacts list of instant messages, the method comprising the steps of:

sending data from the requester user to an IM contact of a contacts list;

checking if the contact is a real person or an object;

in case the IM contact is a real person contact, sending the message in natural language data to the destination contact;

in case the IM contact is an object contact, loading the natural language interface (NLI) which consists in:

detecting tags and commands from the original message;

analyzing the context of the message and the ontology of the object in order to identify its functions;

evaluating the possible object commands, identifying those most probable of the requester;

submitting a command/request to the object; and receiving a response from the object and translating it to a natural language response.

A system/device implementing the method of the present invention will provide a new, disruptive way of interaction (message/information exchange) among devices, smart appliances, web services, software applications (THINGS/objects) and people. The present invention provides an instant messaging ("chat" like) based solution to Internet of Things (IoT), using natural language not only to chat with people but specially to submit commands to objects.

BRIEF DESCRIPTION OF THE FIGURES

The objectives and advantages of the present invention will become more clear by means of the following detailed description of a preferred but non-limitative embodiment of the invention, in view of its appended figures, wherein.

DETAILED DESCRIPTION OF THE INVENTION

Given all that has been stated so far, is the main objective of the present invention to provide a method to enable smart devices users to interact in a similar manner with devices, smart appliances, web services, software applications (THINGS/objects) and people. Having this in mind, the drawings will now be explained.

Figure 1:
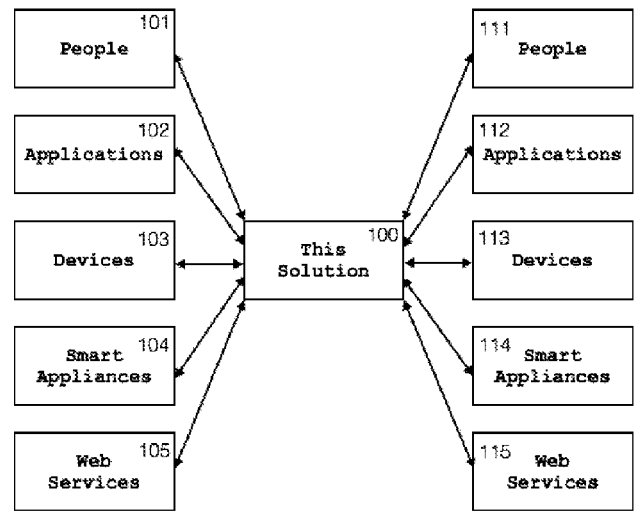
FIG. 1 shows a general view of the solution, where people and objects use the proposed method (a centralized solution) to interact with other people or objects.

FIG. 1 illustrates a general view of the present invention, wherein the proposed method 100 is used to enable people 101, applications 102, devices 103, smart appliances 104 and Web Services 105 to communicate with other people 111, applications 112, devices 113, smart appliances 114 and Web Services 115, all using the method 100 as the main, centralized solution for doing so. As will be further detailed, the proposed method 100 uses natural language not only to chat with people (101, 111) but specially to submit commands to objects (102, 103, 104, 105, 112, 113, 114, 115). To the best of our knowledge, the proposed method 100 is a disruptive way of interaction and message/information exchange among people and/or objects.

Figure 2:
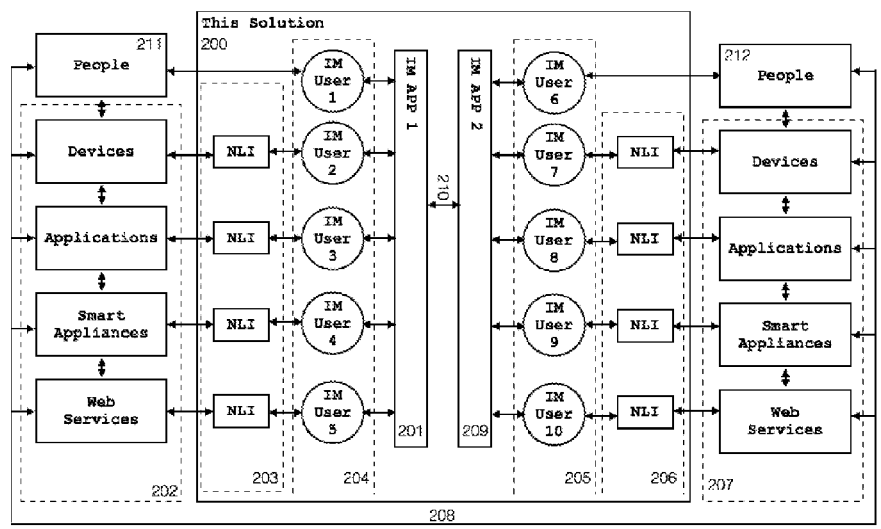
FIG. 2 shows a detailed view of the solution, showing the IM contact being used to represent not only people but also objects, which might use a natural language interface to allow natural communication between user and objects.

FIG. 2 is a detailed view of the present invention, wherein the proposed method 200 is used by people 211 and objects 202 to communicate with other people 212 and objects 207. The method 200 maps/registers all people 211/212 and objects 202/207 as Instant Messaging (IM) contacts 204/205 in a contact list.

Registering/mapping people 211/212 as IM contacts 204/205 is a trivial and instantaneous action, since it is a well-known feature ("contact list") of current smartphones and similar user devices.

Registering/mapping objects 202/207 as IM contacts 204/205 could be done as soon as:

the user device (e.g., smartphone) detects and/or connects/"pairs" with other devices, smart appliances and general sensors (for example, but not limited to, via Wi-Fi, Bluetooth, NFC, etc.), and then these devices, smart appliances and sensors are able to be registered/mapped as a new IM contact;

the user device access an (yet) unregistered/unmapped Web Service, and then it also could be registered/mapped as a new IM contact; or the user installs or remotely invokes a new software application, and then again it could be registered/mapped as a new IM contact.

This IM contacts representation 204/205 will be used (as a "contact list") by an IM application 201/209 to identify who (people) or what (objects) wants someone (people) or something (object) to interact with.

When a real person 211 will send a message to other real person 212, a human understandable data will be sent by this person 211 using an IM representation 204 from the IM application 201 which sends the data to an IM server 210. The IM server 210 will route the data to another IM application 209 that holds the IM contact representation 205 of the receiver person 212. The data transmitted might be encapsulated as a digital sound, digital picture or video, a compressed text, etc. however this data is presented to the real person consumer as a sound, picture, video, text, etc. in a human understandable way.

When a real person 211 sends a message to an object 207 (i.e., sends a command in natural language), a human understandable data will be sent by this person 211 using a IM representation 204 from the IM application 201 which sends these data to an IM server 210. The IM server 210 will route the data to another IM application 209 that holds the IM contact representation 205 of the receiver object 207. The data transmitted might be encapsulates as a digital sound, digital picture or video, a compressed text, etc. however this data might be processed by a natural language interface (NLI) 206 which translates the data according to the object 207 being selected, in order to allow the object 207 to understand what the person 211 wants. Similarly, when an object 202 sends a message to other real person 212, actually it refers to data, commands, feedback, context, ontology, etc. that is sent to a natural language interface (NLI) 203 which translates the data into a human understandable data and that sends the data using an IM representation 204 from the IM application 201 which, in turn, will send the data to an IM server 210. The IM server 210 routes the data to another IM application 209 that holds the IM contact representation 205 of the receiver person 212. The data transmitted might be encapsulated as a digital sound, digital picture or video, a compressed text, etc., however this data is presented to the real receiver person as a sound, picture, video, text, etc. in a human understandable way.

When an object 202 sends a message to other object 207, actually it refers to a data, command, feedback, context, ontology, etc. that is sent to a natural language interface (NLI) 203 which translates the data into a human understandable data that are sent using an IM representation 204 from the IM application 201 which, in turn, sends this data to an IM server 210. Alternatively, in the case of object-to-object communication, it could be directly used a machine-to-machine (M2M) protocol, with no translation to natural language (considering no human is involved). The IM server 210 routes the data to another IM application 209 that hold the IM contact representation 205 of the receiver object 207. The data transmitted might be encapsulated as a digital sound, digital picture or video, a compressed text, etc. however this data might be processed by a natural language interface (NLI) 206 which translates the data according to the object 207 being selected, in order to allow the object 207 to understand what the other object 202 requested.

In some cases, messages might not use the IM server 210 to reach the desired receiver, as the IM application 201 might be able to route data to users connected to the same IM application 201. Also, some cases 208 allow a direct data exchange between objects 202/207, people 211/212, people and objects 211/207. This usually happens after some non-IM data exchange was requested by some command requested via the IM protocol.

Figure 3:
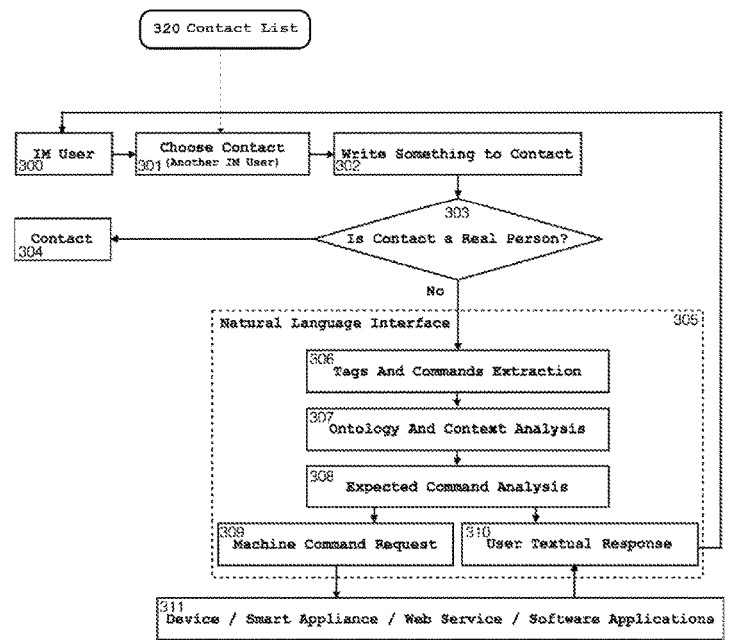
FIG. 3 is a flowchart of the proposed method, indicating how user submits commands or texts to objects or people.

FIG. 3 shows a flowchart of the proposed method, disclosing how to handle a message sent by an IM contact representation 300, which might represent a real person or an object. First the requester user (which is also an IM contact) 300 chooses another IM contact 301 from a contact list 320 to send some data 302 in natural language (e.g. English). As soon as the message is sent, the method verifies 303 if the destination/chosen contact 301 is a real person or an object. If the destination/chosen contact 301 is a real person contact, then the message will be sent as it is (i.e., natural language data, with no translation) to destination/chosen contact 304. However, if the destination/chosen contact 301 is not a real person (i.e., it is an object), then the natural language interface (NLI) 305 is activated. First, tags and commands are extracted/detected 306 from the original data/message 302, then it is analyzed the context of messages and object ontology 307 in order to identify what the object is capable of doing with it (possible actions/commands), based on the history of sent messages. After that, an expected command analysis 308 module evaluates what is the most probable desire or intention of the requester 300, and then provide a machine command request/submission 309 to the object 311. Depending on the command submitted to the object 311 and the respective feedback from the object 311, the natural language interface (NLI) 305 receives the feedback and translates it to some human readable expected response 310 (with or without machine tags/commands) to the requester 300.

Figure 4:
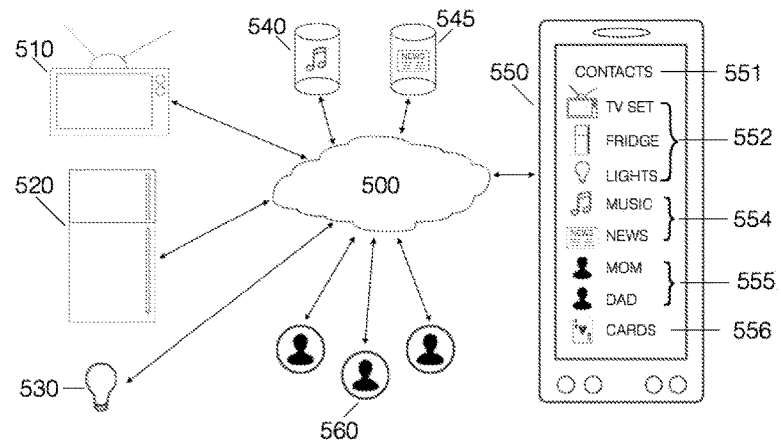
FIG. 4 shows the usage context of the proposed method of the present invention, illustrating an embodiment where people and objects are connected to a common IM server, and an IM client where all people and objects are displayed as IM contacts/users.

FIG. 4 shows another approach of the solution's usage, representing a possible example of how this solution might be implemented using a local IM server 401 to isolate home devices as a TV set 410, a smart refrigerator 420, a lamp bulb 430, etc., allowing all home devices communication to stay apart from the main cloud IM server 400. This approach would make it easier to register or unregister home devices, which is the case when the user respectively buy or sell these devices. The local IM server 401 might be a dedicated device connected to the home network, or even can be incorporated to other devices like a Wi-Fi router, or a TV set. In FIG. 4 setup, the local IM server 401 is the only home device connected to the cloud IM server 400. For a message sent to any home device from a object outside the home network, the cloud IM server 400 routes the message 402 to the home network local IM server 401, which authorizes or denies the delivery of the message, increasing home security. In such configuration, home devices are only reachable through the local IM server 401. All the other objects, like web services 440, people 460, smart devices 450, etc. still follows the approach proposed on FIG. 4, having an IM server global for all the other objects. Even using the approach proposed by FIG. 4, some devices 470 might be connected direct to the cloud IM server, without using the local IM server approach. FIG. 4 also shows a contact list 451 on the smart device 450 screen. On this contact list 451 all objects 410, 420, 430, 440 and people 460 are represented as contacts 452, 453. The devices 410, 420, 430 are still present on the contact list 452, indicating that such devices might be reachable by an object if the local IM server 401 allows it.

Figure 5:
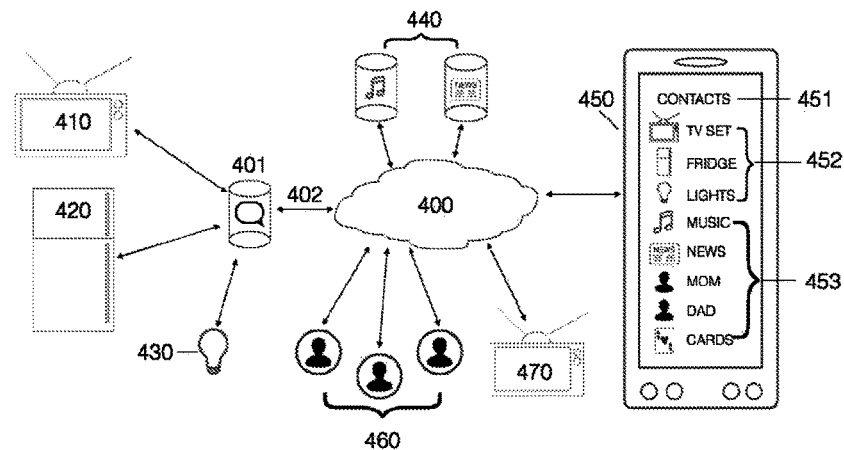
FIG. 5 shows another possible usage context of the proposed method of the present invention, implemented using a local IM server.

FIG. 5 shows abroad context of the solution's usage, representing a possible example of how this solution might be implemented using an IM server 500, a TV set 510, a refrigerator 520, a lamp bulb 530, a music web service 540, a news web service 545, a smart device 550 and people 560. On the smart device 550 screen a contact list 551 is displayed. On this contact list 551 all objects 510, 520, 530, 540, 545 and people 560 are represented as contacts (a plurality of contacts 552 for devices/appliances 510, 520, 530, a plurality of contacts 554 for web services 540, 545, a plurality of contacts 555 for real people 560, and a plurality of contacts 556 for software applications hosted by the smart device 550).

Figure 6:
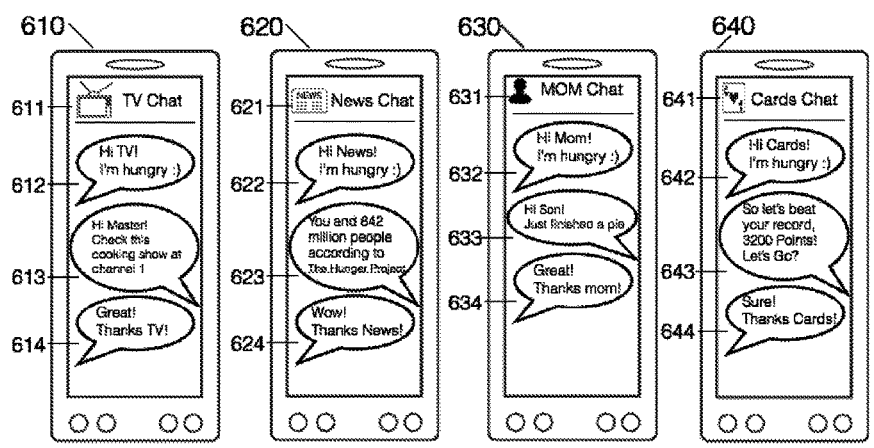
FIG. 6 shows an example on how the same text message might generate different outputs depending on the user.

Using the example of the contact list 551 (FIG. 5), FIG. 6 illustrates how the same interaction (original message or request) 612, 622, 632, 642 might trigger different responses 613, 623, 633, 643 from different contacts 611, 621, 631, 641 depending on history, context and ontology of each contact 611, 621, 631, 641. In all situations, different contacts (the home appliance contact 611, the web service contact 621, the real person contact 631 and the software application contact 641) receive the same input, in this case, the message "I'm hungry :)". But even receiving the same input, each contact 611, 621, 631, 641 might provide a different response 613, 623, 633, 643, according to the context where the person or object is immersed. In this example, the TV 611 might propose a cooking show 613, the news service 621 might give some information about global hunger 623, the user's mom 631 might invite him to eat 633, and a card game 641 might invite him to break his record 643. A thank you message 614, 624, 634, 644 could also be sent to all contacts 611, 621, 631, 641 (as a default final message without triggering any other action, or as a confirmation message if user accepts the contact suggestion/feedback/response—for example, if the user confirms/accepts to watch the cooking show 613 proposed by TV 611 after the original message 612 "I'm hungry :)").

Figure 7:
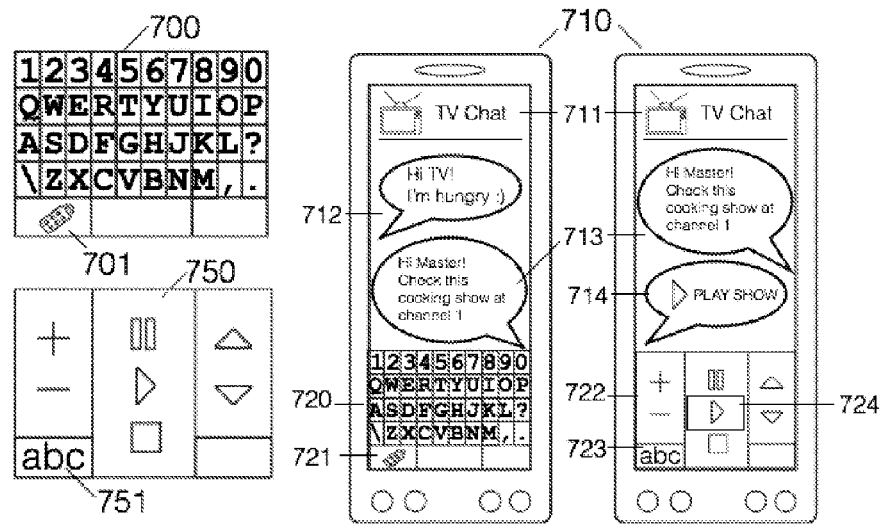
FIG. 7 shows the keyboard shifting to remote control, where objects might provide a custom keyboard to user interface according to the context, allowing easy access to basic functions/commands.

FIG. 7 shows a possible virtual keyboard customization according to the object selected. The default keyboard 700, 720 have a button, gesture, etc. 701, 721 that might change to a customized keyboard 750, 722 according to the object. This custom keyboard 750, 722 might be predefined by IM application, or might be proposed by the object by some proposed keyboard parameter present in the IM protocol or using some custom tag, etc. In this example the user of device 710 is "chatting" with the TV contact 711, and after a cooking show 713 proposed by the TV contact 711, the user changes 721 to a custom keyboard 722 and the PLAY button 724 is selected to watch the proposed cook show 713. This button 724 might be translated into a text message, in this example "PLAY SHOW" 714. The customized keyboard 750, 722 might be changed back to the default keyboard 700, 720 by a button, gesture, etc. 751, 723.

Figure 8:
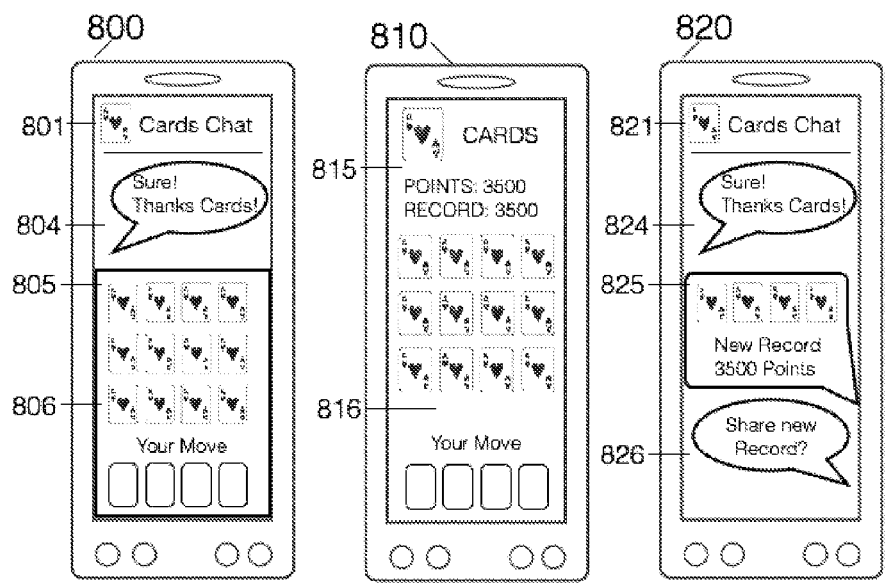
FIG. 8 shows examples of interactions not using text, as some applications, services, etc. might require a visual interface accessible from chat screen.

FIG. 8 shows how the chat interface might support display areas 805, 815 dedicated for user interactions. The idea proposed by this example is that an object contact might also request a dedicated interface for interactions. In case of a software application like games 801, 821, it is clear that only texting 804 it is not enough to fulfill all the game interactions needs 805, 806, 815, 816. So to support this solution, a dedicated interaction area 805 which also might be in full screen 816 is needed and proposed here. Also, a custom message 825 used to share 826 some achievements, results, etc. with other contacts might be useful.

Figure 9:
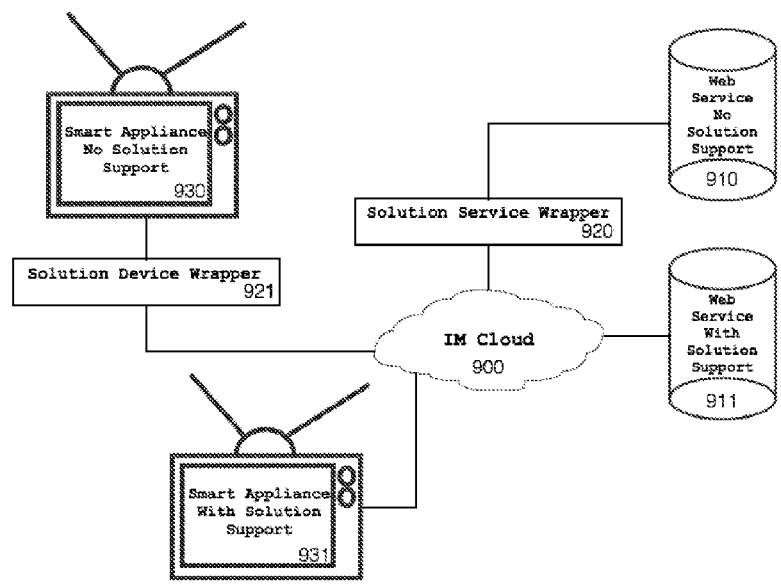
FIG. 9 shows device and services wrappers to allow devices and services not supporting the method of the present invention to be also used.

FIG. 9 highlights that some web services and some smart devices/appliances 910, 930 might not support the proposed solution hosted in an IM server 900. The figure shows a smart appliance 931 with the solution incorporated connected to the IM server 900, and also a smart appliance 930 which does not support the solution, using a device wrapper 921 to allow the use of the solution and acting as an intermediate to establish the connection between the IM server 900 and the smart appliance 931. It also shows a web service 911 with the solution incorporated connected to the IM server 900 and a web service 910 which does not support the solution, using a service wrapper 920 to allow its usage by the solution, acting as an intermediate to establish the connection between the web service 911 and the IM server 900.

Figure 10:
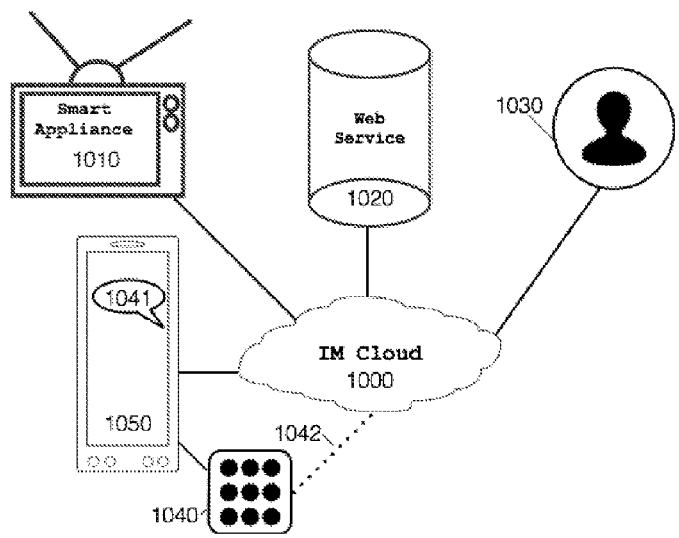
FIG. 10 shows people and objects connections to IM cloud.

FIG. 10 shows that people 1030, web services 1020, smart appliances 1010, smart devices 1050 connects to an IM server 1000, while software applications 1040/1041 might only be connected to the device 1050 where the application is installed. However, software applications 1040/1041 might share some content and data 1042 with the IM server 1000 (and with IM contacts) using its hosting device 1050 as an intermediate to establish such connection.

As already presented, the present invention extends the concept of Instant Messaging, Internet of Things, Web Services, Software Applications allowing a single and unique natural language to communicate with, also eliminating non-standards protocols as all objects and people wound use the same IM protocol and natural language to communicate.

Example of an Embodiment of the Present Invention

For illustration and better understanding of the present invention, an embodiment is presented as example. The following example must be understood only in an explanatory way, not limiting the scope of the present invention or its generalities.

Figure 11:
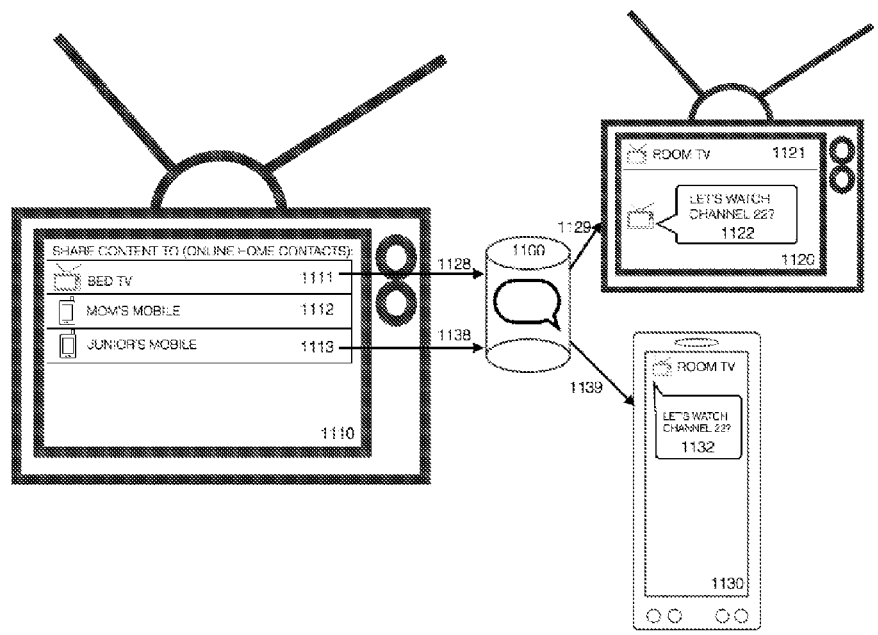
FIG. 11 shows how the user could request content sharing among devices via smart TV.

In this example, it is presented an embodiment of a system which allows instant messaging (chat) among users and smart TVs, including remote control (send commands, receive image/video streaming, etc. through the user devices). FIG. 11 shows how the user could request content sharing among devices via smart TV. Suppose the user is watching a show on smart TV 1110 in the living room, and wants to share the content to other devices. The contact list presents all online home contacts 1111, 1112, 1113. The user chooses 1128, 1138 one or more devices from the contact list (in this example, bedroom TV 1111 and Junior's mobile 1113), and the local IM server 1100 shares the content 1129, 1139 with the respective chosen devices. Both on the bedroom TV 1120 and on the mobile screen 1130 may appear a chat message 1121 from living room TV, asking confirmation 1122, 1132 to the users of said devices 1120, 1130. If the users confirm/authorize, the content is shared to devices 1120, 1130.

Figure 12:
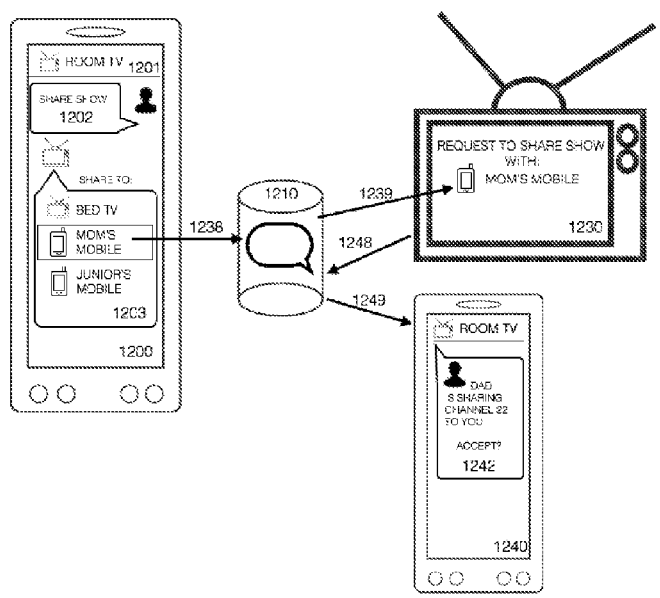
FIG. 12 shows how the user can use his/her smartphone to share content among other devices via chat.

On the same embodiment of this example, according to FIG. 12, it is also possible to use chat to share content among other devices. Suppose the user sends via smartphone 1200 a chat message to "living room smart TV" 1201, requesting that the contact "living room smart TV" 1201 shares its contents to one or more destination devices from the contact list 1203 (in this example, mom's mobile), The request command is sent 1238 to the local IM server 1210, which forwards 1239 the request command to the living room smart TV 1230. Then, the living room smart TV 1230 shares 1248, 1249 its content via local IM server 1210 with the destination device (in this case, mom's mobile 1240). On the destination device 1240 screen may appear a chat message from living room smart TV 1230, asking confirmation 1242 to the user of destination device 1240. If the user confirms/authorizes, the content is shared to device 1240.

Figure 13:
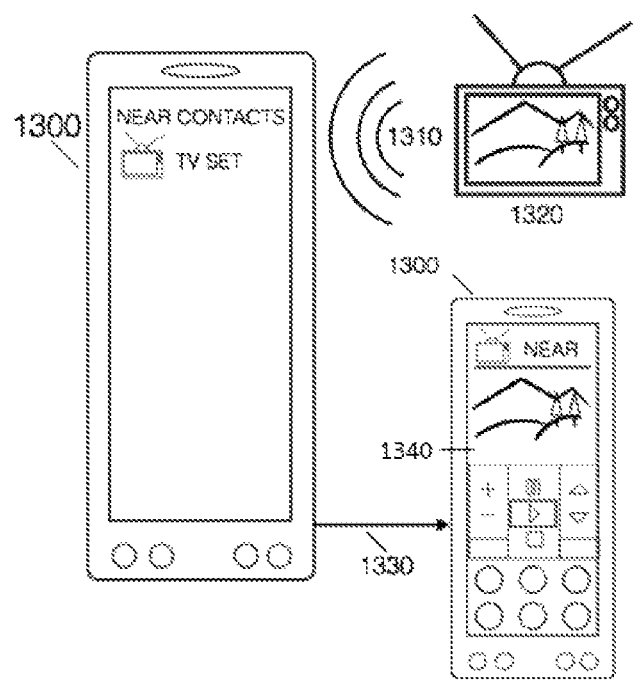
FIG. 13 shows an embodiment of the present invention in the contextual behavior triggered by near devices, where the user with his/her smartphone approaches at a smart TV, being closer enough to be able to wirelessly communicate each other.

According to FIG. 13, another feature of an embodiment of the present invention is the contextual behavior triggered by near devices. Suppose the user (with his/her smartphone 1300) approaches a smart TV 1320, being closer enough to be able to wirelessly communicate 1310 each other. In this situation, the smartphone 1300 automatically changes/shifts 1330 to a customized remote control to send commands to the near smart TV 1320 and receive content/streaming 1340 from the near smart TV 1320.

As mentioned before, the above example must be understood only in an explanatory way, not limiting the scope of the present invention or its generalities. As described in this document, the present invention is able to communicate (chat) to a plurality of devices/objects (not limited to smart TVs, as exemplified) besides people (human users), and it can perform multiple actions/commands/requests via chat (not limited to share content with other devices, as exemplified).

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

What is claimed is:

1. A method comprising:
   preparing a message to send from the user device to an instant messaging (IM) contact in a contact list of the user device;
   establishing whether the IM contact is a person or an object; and determining, based on a result of the establishing, whether to send the message to the IM contact or load a natural language interface (NLI), wherein the determining includes:
  if the IM contact is determined to be a person, sending the message in natural language format to the IM contact;
  if the IM contact is determined to be an object, loading the NLI in the user device, including:
    detecting a marker and a command of the message;
    analyzing a context of the message and an ontology of the object to identify a purpose of the message;
    evaluating possible commands for the object and identifying a command among the possible commands that most likely reflects and intention of the user;
    submitting the identified command to the object; and
    receiving a response from the object and translating the response into a natural language response.

2. The method according to claim 1, characterized in that a registration of a new IM contact in the contact list includes:
  pairing the user device with another device that can be registered as a new IM contact in the contact list.

3. The method according to claim 2, characterized in that the pairing the user device includes pairing the user device using at least one of Wi-Fi communication, Bluetooth communication, and near field communication (NFC).

4. The method according to claim 1, characterized in that the message is prepared using text to speech technology.

5. The method according to claim 1, characterized in that the object includes at least one of a device, smart appliance, web service, and software application.

6. The method according to claim 1, characterized in that the message includes at least of digital audio, digital image, digital video, and compressed text.

7. The method according to claim 1, characterized in that a service wrapper is used to establish a connection between the user device and a web service that does not support direct communication with the user device.

8. The method according to claim 1, characterized in that a device wrapper is used to establish a connection between the user device and a smart appliance that does not support direct communication with the user device.

9. A non-transitory computer-readable recording medium storing a program to implement a method comprising:
  preparing a message to send from a user device to an instant messaging (IM) contact in a contact list of the user device;
  establishing whether the IM contact is a person or an object; and
  determining, based on a result of the establishing, whether to send the message to the IM contact or load a natural language interface (NLI), wherein the determining includes:
    if the IM contact is determined to be a person, sending the message in natural language format to the IM contact;
    if the IM contact is determined to be an object, loading the NLI, including:
      detecting a marker and a command of the message;
      analyzing a context of the message and an ontology of the object to identify a purpose of the message;
      evaluating possible commands for the object and identifying a command among the possible commands that most likely reflects and intention of the user;
      submitting the identified command to the object; and
      receiving a response from the object and translating the response into a natural language response.

10. An apparatus comprising:
at least one memory configured to store instructions; and
at least one processor configured to execute the stored instructions to implement a method comprising:
  preparing a message to send from the apparatus to an instant messaging (IM) contact in a contact list of the user device;
  establishing whether the IM contact is a person or an object; and
  determining, based on a result of the establishing, whether to send the message to the IM contact or load a natural language interface (NLI), wherein the determining includes:
    if the IM contact is determined to be a person, sending the message in natural language format to the IM contact;
    if the IM contact is determined to be an object, loading the NLI, including:
      detecting a marker and a command of the message;
      analyzing a context of the message and an ontology of the object to identify a purpose of the message;
      evaluating possible commands for the object and identifying a command among the possible commands that most likely reflects and intention of the user;
      submitting the identified command to the object; and
      receiving a response from the object and translating the response into a natural language response.

* * * * *

UNITED STATES PATENT AND TRADEMARK OFFICE
CERTIFICATE OF CORRECTION

PATENT NO. : 10,003,683 B2
APPLICATION NO. : 14/662714
DATED : June 19, 2018
INVENTOR(S) : Gustavo Kaneblai Martins Costa et al.

Page 1 of 1

It is certified that error appears in the above-identified patent and that said Letters Patent is hereby corrected as shown below:

In the Claims

Column 10, Line 63:
In Claim 1, delete "the", and insert -- a --, therefore.

Column 11, Line 35:
In Claim 6, delete "least of", and insert -- least one of --, therefore.

Signed and Sealed this
Eleventh Day of September, 2018

Andrei Iancu
*Director of the United States Patent and Trademark Office*